United States Patent
Stansbury et al.

(10) Patent No.: US 7,822,311 B2
(45) Date of Patent: Oct. 26, 2010

(54) HIGH DENSITY TELECOMMUNICATIONS CHASSIS WITH CABLE MANAGEMENT STRUCTURE

(75) Inventors: James Stansbury, Farmington, MN (US); Zakhary Bluband, Minnetonka, MN (US); Tim Kalstad, Elko, MN (US); Wayne DeBoef, Buffalo, MN (US)

(73) Assignee: Canadian Imperial Bank of Commerce, Toronto, Ontario (CA)

( * ) Notice: Subject to any disclaimer, the term of this patent is extended or adjusted under 35 U.S.C. 154(b) by 0 days.

(21) Appl. No.: 12/389,229

(22) Filed: Feb. 19, 2009

(65) Prior Publication Data

US 2009/0238533 A1 Sep. 24, 2009

Related U.S. Application Data

(60) Provisional application No. 61/030,760, filed on Feb. 22, 2008.

(51) Int. Cl.
*G02B 6/00* (2006.01)

(52) U.S. Cl. .................. 385/135; 385/134; 455/347; 455/348; 455/349; 175/50; 361/724; 361/725; 361/727

(58) Field of Classification Search .................. 385/135; 455/348; 361/725
See application file for complete search history.

(56) References Cited

U.S. PATENT DOCUMENTS

| | | | |
|---|---|---|---|
| 2,865,979 A | 12/1958 | Klassen | |
| 3,257,156 A | 6/1966 | Sisk et al. | |
| 3,335,326 A | 8/1967 | Bonin et al. | |
| 4,614,383 A | 9/1986 | Polley et al. | |
| 5,893,539 A | 4/1999 | Tran et al. | |
| 6,049,709 A | 4/2000 | Anderson et al. | |
| 6,289,210 B1 | 9/2001 | Anderson et al. | |
| 6,305,556 B1 | 10/2001 | Mayer | |
| 6,326,547 B1 | 12/2001 | Saxby et al. | |
| 6,327,139 B1 | 12/2001 | Champion et al. | |
| 6,392,149 B1 | 5/2002 | Kim et al. | |
| 6,398,149 B1 | 6/2002 | Hines et al. | |
| 6,435,354 B1 | 8/2002 | Gray et al. | |
| 6,501,020 B2 | 12/2002 | Grant et al. | |
| 6,523,918 B1 | 2/2003 | Baiza | |
| 6,545,562 B2 | 4/2003 | Loeffelholz et al. | |
| 6,625,374 B2 | 9/2003 | Holman et al. | |
| RE38,311 E * | 11/2003 | Wheeler | 385/135 |
| 6,675,720 B2 * | 1/2004 | Peterson et al. | 104/196 |
| 6,685,033 B1 * | 2/2004 | Baddour et al. | 211/26 |
| 6,805,248 B2 | 10/2004 | Champion et al. | |
| 6,811,039 B2 | 11/2004 | Chen et al. | |
| 6,856,505 B1 | 2/2005 | Venegas et al. | |
| 6,867,980 B2 | 3/2005 | Wrycraft | |

(Continued)

*Primary Examiner*—Ryan Lepisto
(74) *Attorney, Agent, or Firm*—Brinks Hofer Gilson & Lione

(57) ABSTRACT

A telecommunications chassis is disclosed herein. The chassis includes a housing defining a front end, a rear end and an interior, the chassis housing telecommunications equipment within the interior, cables connected to the telecommunications equipment configured to exit through the rear end. The housing is configured for mounting to a telecommunications rack and being movable relative to the rack between a closed position and an open position. A cable management structure is mounted between the housing and the rack, the cable management structure configured to move the cables exiting the rear of the housing upwardly, out of the way of the housing when the housing is moved from the open position toward the closed position.

22 Claims, 14 Drawing Sheets

U.S. PATENT DOCUMENTS

| | | | |
|---|---|---|---|
| 6,870,734 B2 * | 3/2005 | Mertesdorf et al. | 361/679.4 |
| 6,924,989 B2 | 8/2005 | Hall | |
| 6,945,504 B2 | 9/2005 | Chen et al. | |
| 6,972,949 B1 | 12/2005 | Helgenberg et al. | |
| 7,009,112 B1 | 3/2006 | Mead et al. | |
| 7,121,412 B2 | 10/2006 | Richards et al. | |
| 7,168,576 B2 | 1/2007 | Williams | |
| 7,189,924 B1 | 3/2007 | Popescu et al. | |
| 7,258,583 B1 | 8/2007 | Baiza | |
| 2001/0031124 A1 * | 10/2001 | McGrath et al. | 385/134 |
| 2003/0168235 A1 | 9/2003 | Loeffelholz et al. | |
| 2004/0105219 A1 | 6/2004 | McClellan et al. | |
| 2006/0005981 A1 | 1/2006 | Loeffelholz et al. | |
| 2007/0144982 A1 * | 6/2007 | Nguyen | 211/26 |

* cited by examiner

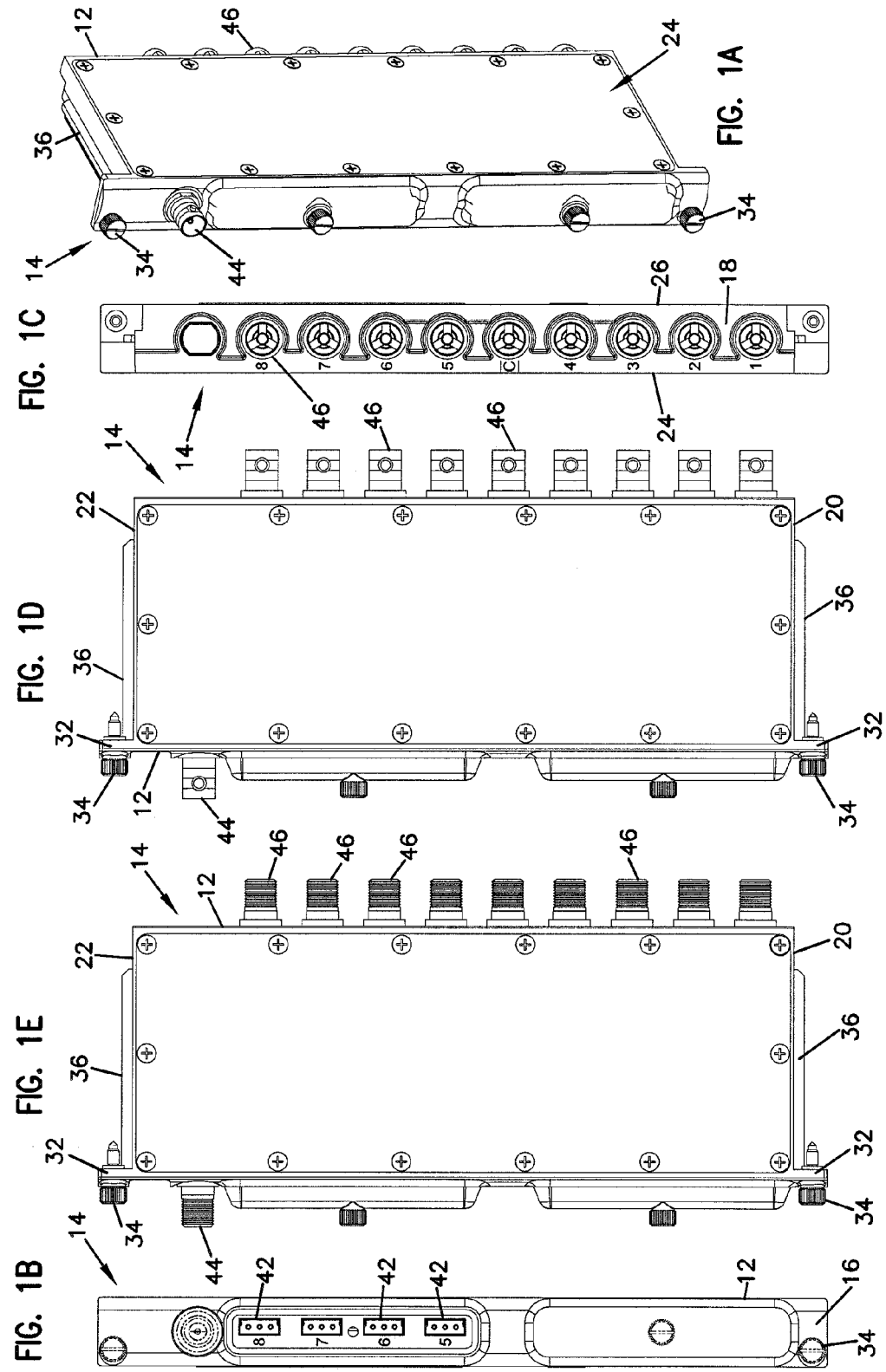

HIGH DENSITY TELECOMMUNICATIONS CHASSIS WITH CABLE MANAGEMENT STRUCTURE

CROSS REFERENCE TO RELATED APPLICATION

This application claims the benefit of U.S. Provisional Patent Application Ser. No. 61/030,760, filed Feb. 22, 2008, which application is hereby incorporated by reference in its entirety.

TECHNICAL FIELD

The present disclosure relates generally to telecommunications equipment. More particularly, the present disclosure relates to chassis for housing telecommunications equipment.

BACKGROUND

To organize telecommunications systems and to provide for design flexibility and scalability, it is common for the telecommunications systems to include a plurality of telecommunications modules that are mounted within one or more chassis. The chassis typically include structures (e.g., flanges) for mounting the chassis within telecommunications racks. FIGS. 26 and 27 of U.S. Pat. Nos. 6,289,210 and 6,049,709 and U.S. Patent Application Publication No. 2004/0105219, which are incorporated by reference in their entireties, disclose example prior art chassis adapted for housing telecommunications modules such as radio frequency (RF) coupler or splitter modules.

In rack-mounted chassis systems, improvements in increasing density as well as accessibility of the components are desired. In addition, cable management for the rack-mounted systems poses a major concern.

SUMMARY

One aspect of the present disclosure relates to a rack-mountable, pull-out, drawer-type telecommunications chassis that is configured to house telecommunications equipment that are inserted into the chassis.

Another aspect of the present disclosure relates to a pull-out, drawer-type telecommunications chassis that includes a cable management structure adjacent the rear of the chassis, the cable management structure including a cable support that moves from a lowered position to an elevated position when the drawer is brought from an open position to a closed position to move the cable out of the way of the chassis.

Examples of a variety of inventive aspects are set forth in the description that follows. It is to be understood that both the foregoing general description and the following detailed description are exemplary and explanatory only and are not restrictive of the broad inventive aspects disclosed herein.

BRIEF DESCRIPTION OF THE DRAWINGS

FIG. 1A is a front perspective view of one of the telecommunications modules shown in FIG. 1;

FIG. 1B is a front view of the telecommunications module of FIG. 1A;

FIG. 1C is a rear view of the telecommunications module of FIG. 1A;

FIG. 1D is a side view of the telecommunications module of FIG. 1A;

FIG. 1E is an alternative embodiment of a telecommunications module that can be used with the telecommunications chassis of FIG. 1, the telecommunications module including F type rear connectors;

DETAILED DESCRIPTION

FIGS. 1-13 illustrate a telecommunications chassis 10 having features that are examples of inventive aspects in accordance with the principles of the present disclosure. According to one embodiment, the chassis 10 is configured to removably receive and house telecommunications modules 12. Some examples of modules 12 that might be used with the telecommunications chassis 10 are RF splitter or coupler modules described in U.S. Pat. Nos. 6,049,709, 6,289,210, 6,545,562, and U.S. Patent Application Publication Nos. 2003/0168235 and 2006/0005981, which references are all incorporated herein in by reference in their entireties.

It will be understood that the telecommunications modules 12 noted above are only a few examples of the type of modules that the chassis 10 may be configured to house. The chassis 10 may be configured to hold other types of modules or other types of telecommunications equipment. Of course, it will also be appreciated that the various aspects of the present disclosure are applicable to chassis for holding components of a fiber system, components of a copper system, or any other type of telecommunications equipment. Thus, it will be appreciated that numerous different types of mounting configurations could be used depending upon the type of equipment desired to be mounted within the chassis 10.

Figure 1:
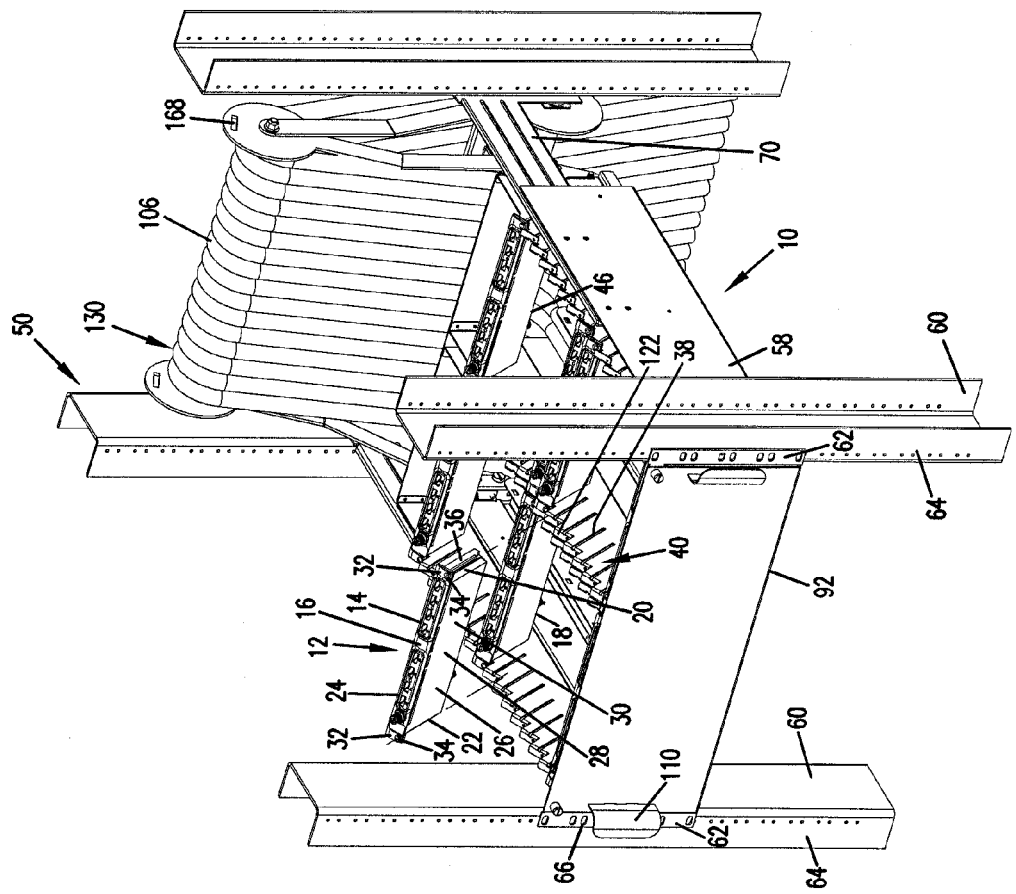
FIG. 1 is a front perspective view of a telecommunications chassis mounted on a telecommunications rack, the telecommunications chassis having features that are examples of inventive aspects in accordance with the principles of the present disclosure, the telecommunications chassis shown with a telecommunications module exploded off the chassis, the telecommunications chassis shown with an example cable routing configuration wherein the cables are routed downwardly as they exit the back of the telecommunications rack.

Referring now to FIG. 1, the chassis 10 is shown with a plurality of telecommunications modules 12, with one of the modules 12 exploded off the chassis 10. The path of insertion of the module 12 is represented by dashed lines. As noted above, according to one example, the telecommunications modules 12 may be RF modules.

Referring to FIGS. 1A-1D, each RF module 12 includes a housing 14 with a front wall 16 and a back wall 18 opposite the front wall 16. The front and the back walls 16, 18 are joined by a pair of sidewalls 20, 22. In a preferred embodiment, a major top side 24 of the housing 14 is open and a major opposing bottom side 26 is closed off by a bottom wall 28. The bottom wall 28 may be defined by a plate 30 formed as an integral member of the rest of the housing 14. Major top side 24 may be enclosed by a removable plate secured to the housing by fasteners (e.g., bolts or screws). Alternatively, major bottom side 26 may be open as well and enclosed by a removable plate as in the major top side 24. The front wall 16 of the module 12 defines flanges 32 extending past both sidewalls 20, 22 of the housing 14. The flanges 32 include locking screws 34. The locking screws 34 are configured for locking the modules 12 within the chassis 10 once the modules 12 have been inserted into the chassis 10.

The sidewalls 20, 22 of the module housing 14 include flanges 36 extending outwardly from the sidewalls 20, 22. The flanges 36 act as guides when they are slidably inserted into intermating slots 38 defined at module receiving locations 40 of the chassis 10, as will be described in further detail below.

The telecommunications module 12 depicted herein may be adapted for at least partially enclosing RF circuitry (e.g., splitter circuitry, combiner circuitry, etc.). The telecommunications module 12 illustrated includes a plurality of receptacles 42 at the front of the module 12. The receptacles 42 are configured to receive plugs that may include circuitry such as attenuator circuitry, equalizer circuitry or other similar circuitry. The telecommunications module 12 illustrated also includes a monitor port 44 at the front of the housing 14.

At the back of the module 12, the housing 14 includes a plurality of connectors 46. While the connectors 46 can have any number of configurations for receiving a signal, the connectors 46 depicted are coaxial connectors such as BNC type connectors (see FIG. 1D) or F type connectors (see FIG. 1E). In certain embodiments, the modules 12 may include 2 or 3 coaxial connectors 46. In other embodiments, as many as 10 coaxial connectors 46 may be provided on each module 12. As shown in FIG. 1C, the depicted embodiment of the module 12 has the capacity for mounting 10 coaxial connectors to the rear wall 18 of the module 12.

Still referring to FIGS. 1-13, the chassis 10 of the present disclosure is configured to be mounted to a telecommunications rack 50 and is shown as being mounted thereto. According to one example, the chassis 10 may be configured to fit a 19-inch four-post rack. The chassis 10 may be configured to fit racks of other sizes. Also, as known in the telecommunications industry, telecommunications racks may come in different depths. As will be described in further detail below, the depth of the chassis 10 can be adjusted to be used with telecommunications racks having different depths. According to one embodiment, the chassis 10 occupies 4 standard rack units (RU) of rack space. Other sizes for the chassis are certainly possible.

Figure 10:
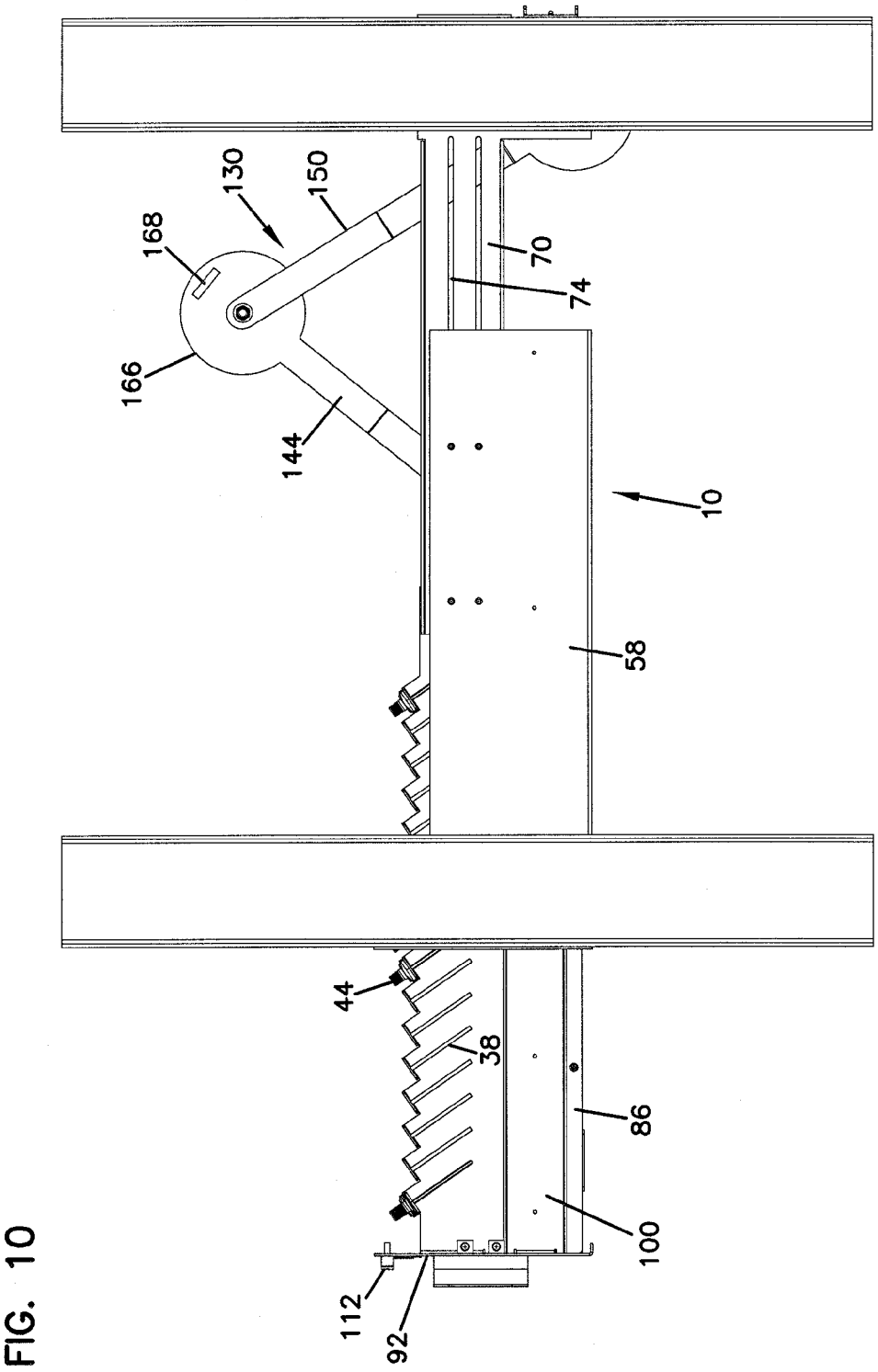
FIG. 10 is a side view of the telecommunications chassis of FIG. 9.
Figure 11:
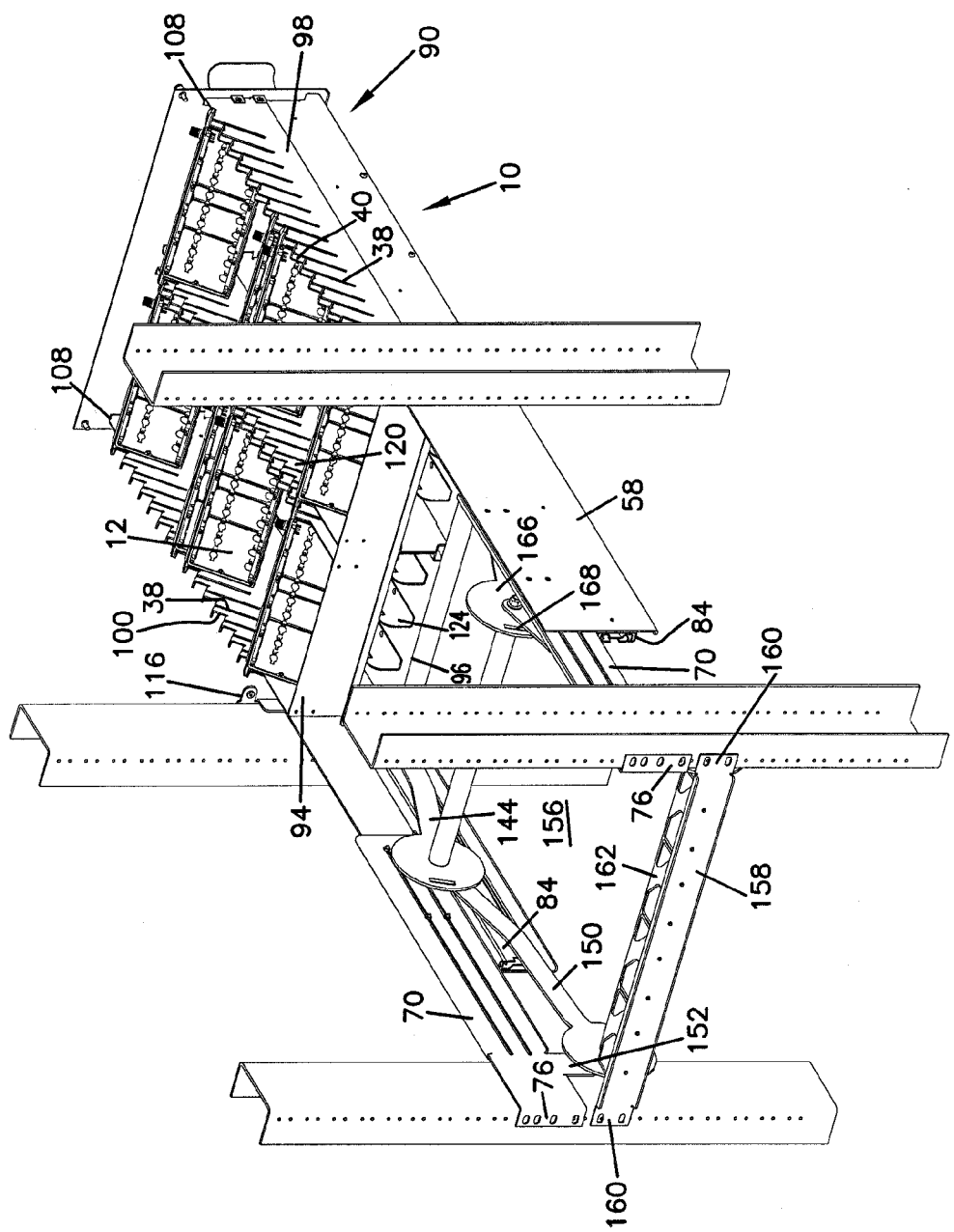
FIG. 11 is a rear perspective view of the telecommunications chassis of FIG. 8, shown in a fully extended, open position with respect to the telecommunications rack.
Figure 12:
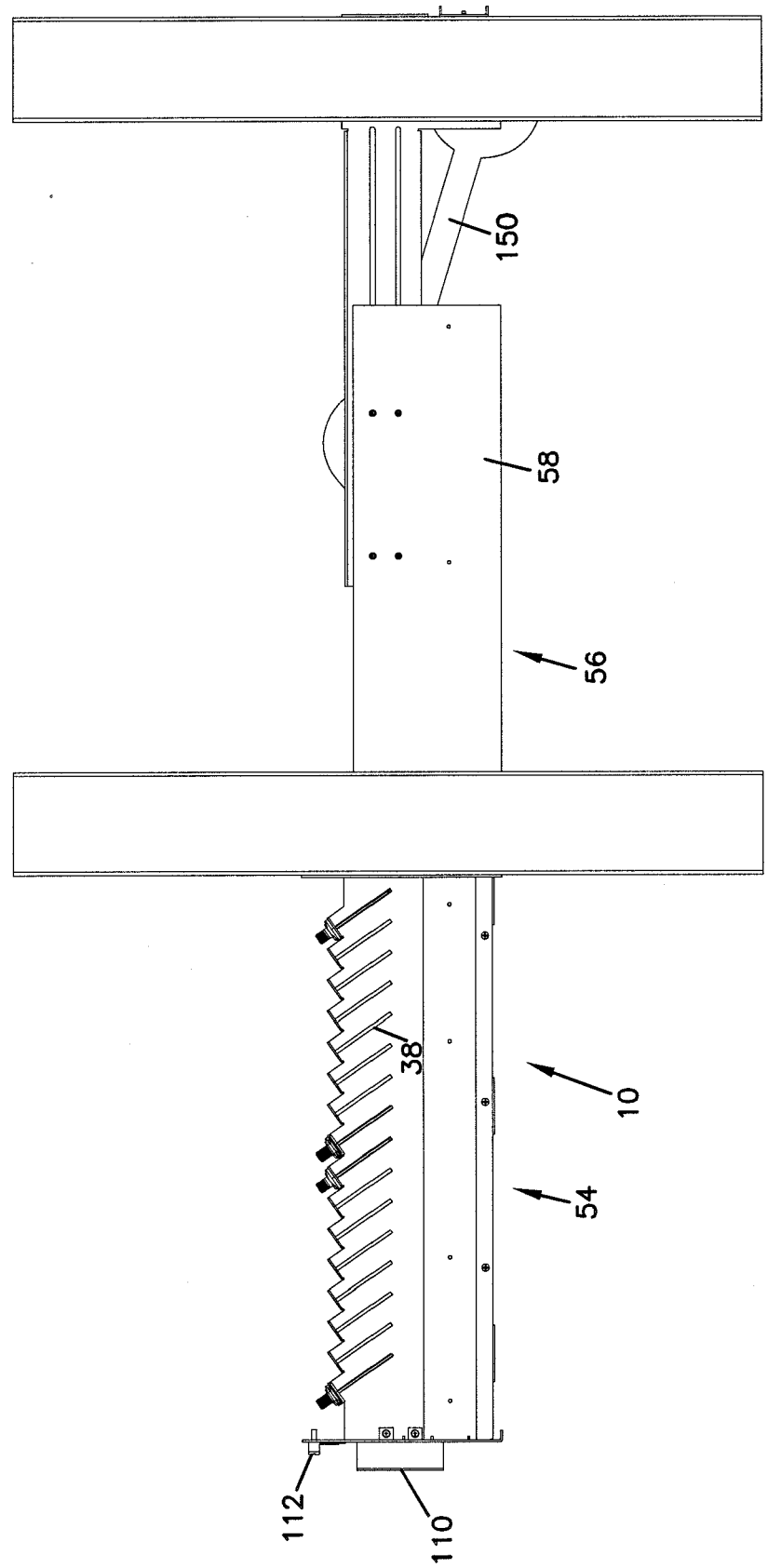
FIG. 12 is a side view of the telecommunications chassis of FIG. 11.
Figure 13:
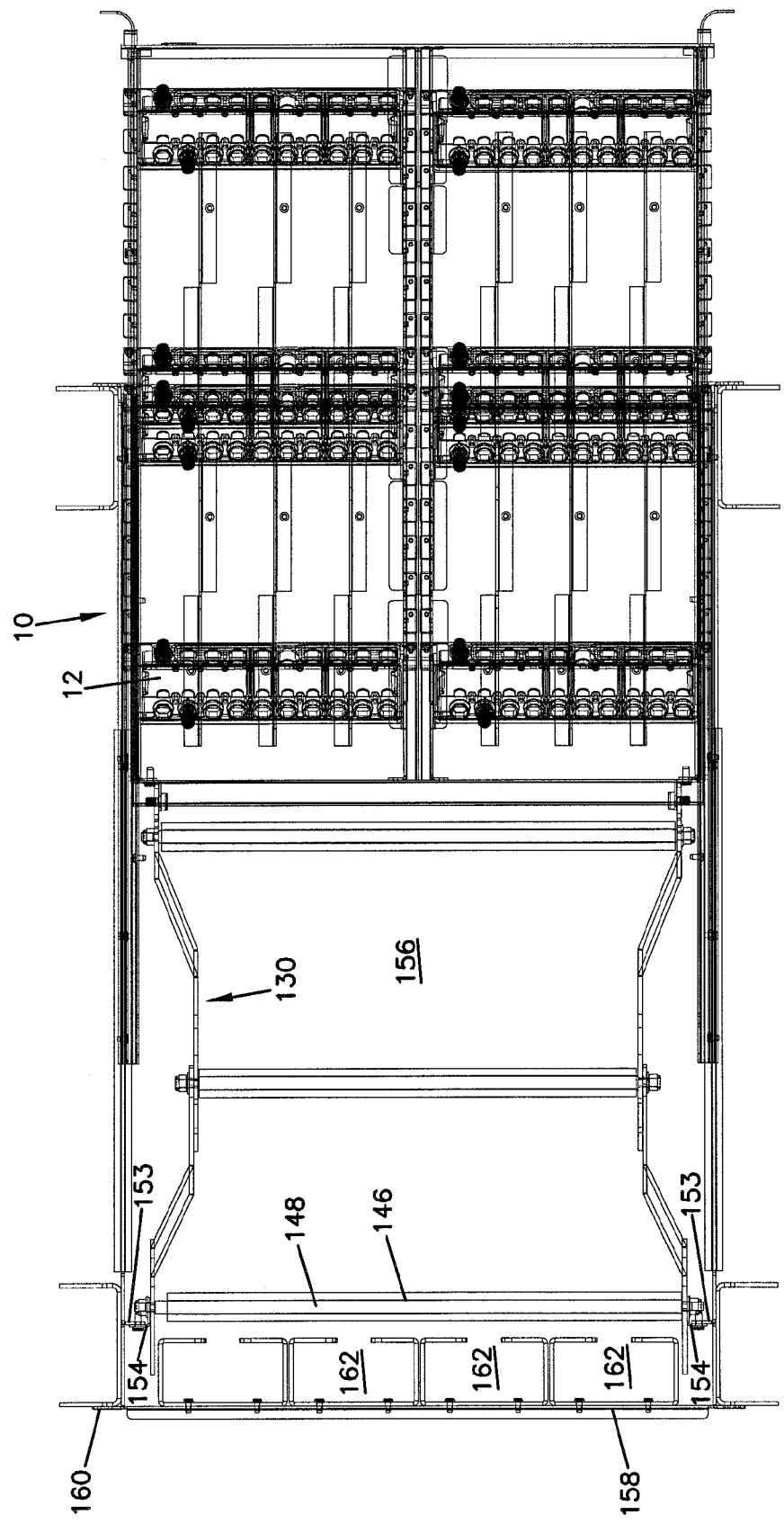
FIG. 13 is a top view of the telecommunications chassis of FIG. 11.

As shown in FIGS. 1-13, the chassis 10 is configured as a drawer-type, pull-out chassis. Once the chassis 10 is mounted to the telecommunications rack 50, the chassis 10 is configured for slidable movement with respect to the rack 50. The chassis 10 can be moved anywhere between a fully retracted position (i.e., closed position) and a fully extended position (i.e., open position) to selectively access the modules 12 housed therein. FIG. 8 illustrates the telecommunications chassis 10 in a fully retracted, closed position. FIGS. 9-10 illustrate the telecommunications chassis 10 in a partially extended position. FIGS. 11-13 illustrate the telecommunications chassis 10 in a fully extended, open position. As will be described in further detail below, when the chassis 10 is in a closed position, the chassis 10 can be locked with respect to the telecommunications rack 50 to prevent unwanted slidable opening.

The chassis includes a frame 52. The frame 52 includes a pull-out portion 54 and a rack-mount portion 56. The rack-mount portion 56 of the frame 52 includes a pair of opposing plates 58 that are mounted to the two front posts 60 of the rack 50. In a non-limiting embodiment, the plates 58 are made of a material such as bent sheet-metal. The plates 58 include flanges 62 at the front that are bent at right angles with respect to the plates 58. The flanges 62 are used to mount the plates 58 to the front faces 64 of the front two posts 60. Fasteners are received through mounting holes 66 defined at the flanges 62 for mounting the plates 58. As shown in FIG. 1, the flanges 62 may be mounted at different desired heights along the rack posts 60 to position the chassis 10 at different desired height levels.

Figure 2:
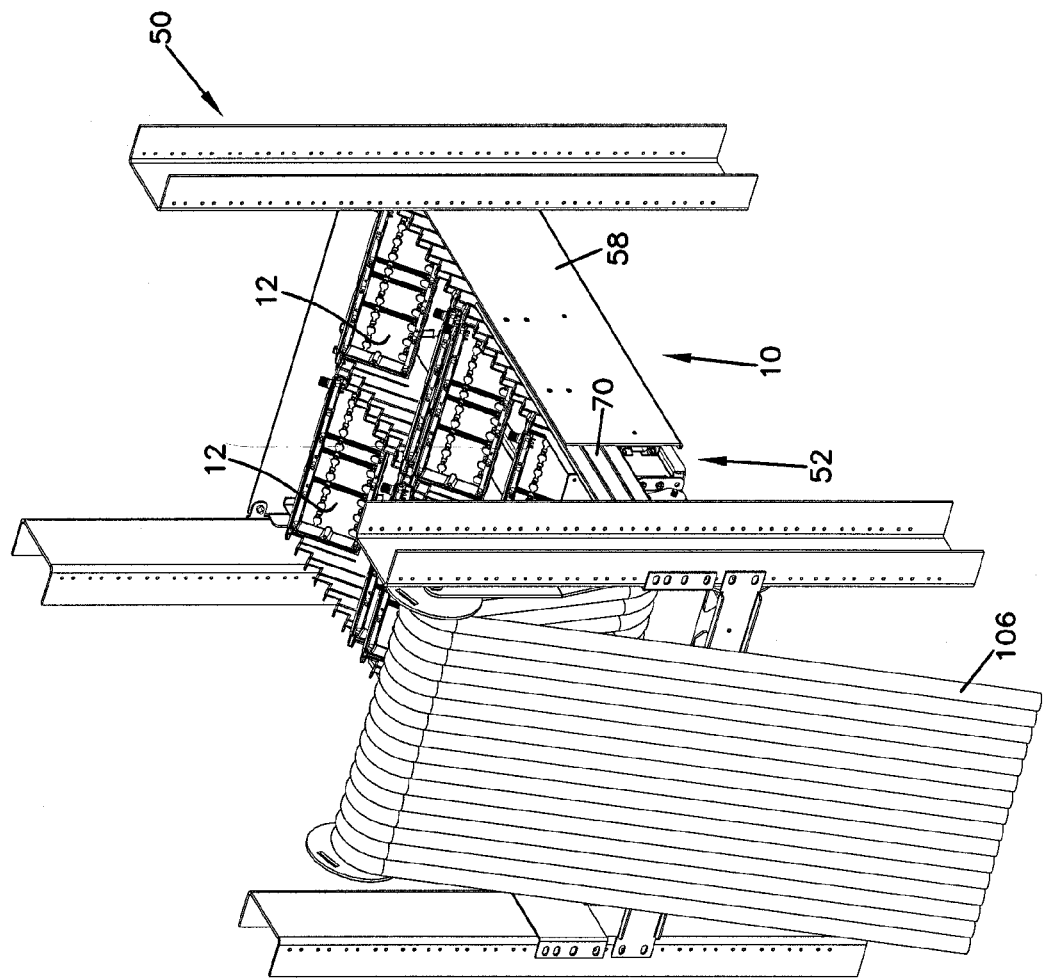
FIG. 2 is a rear perspective view of the telecommunications chassis of FIG. 1.
Figure 3:
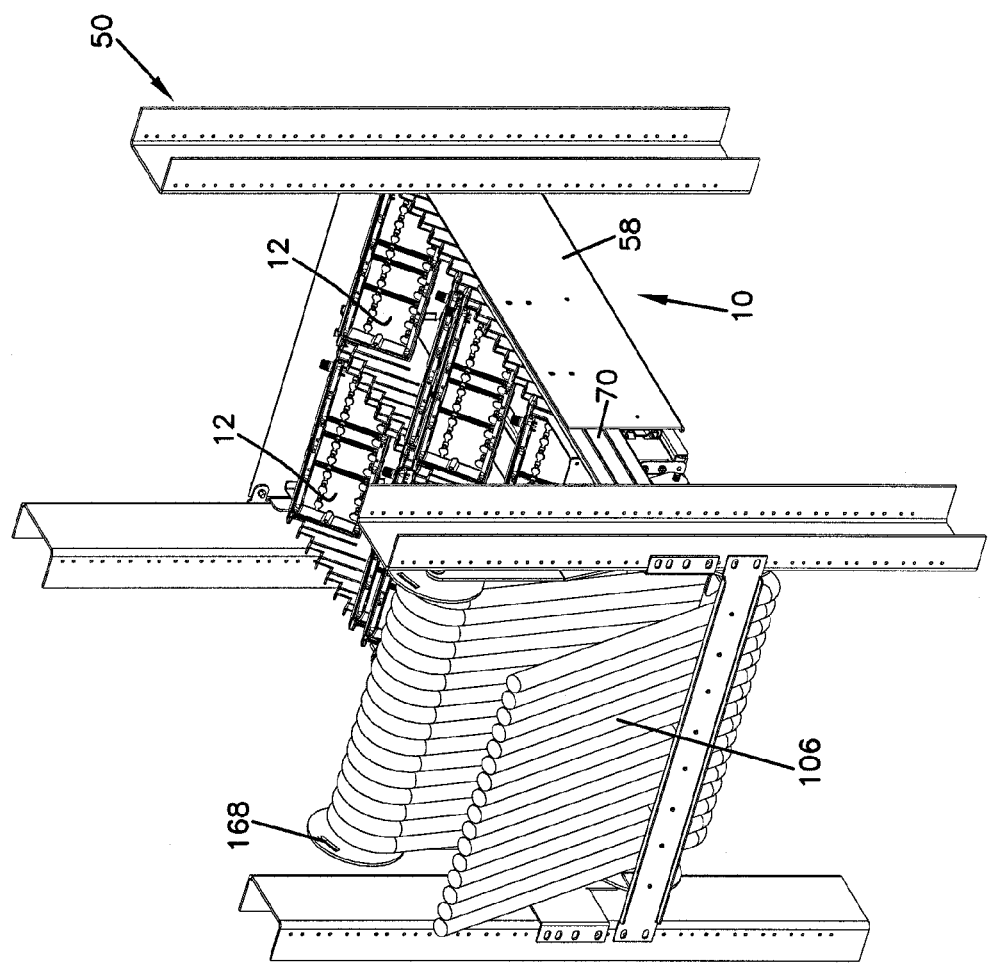
FIG. 3 illustrates the telecommunications chassis of FIG. 2 with an alternate cable routing configuration wherein the cables are routed upwardly as they exit the back of the telecommunications rack.
Figure 4:
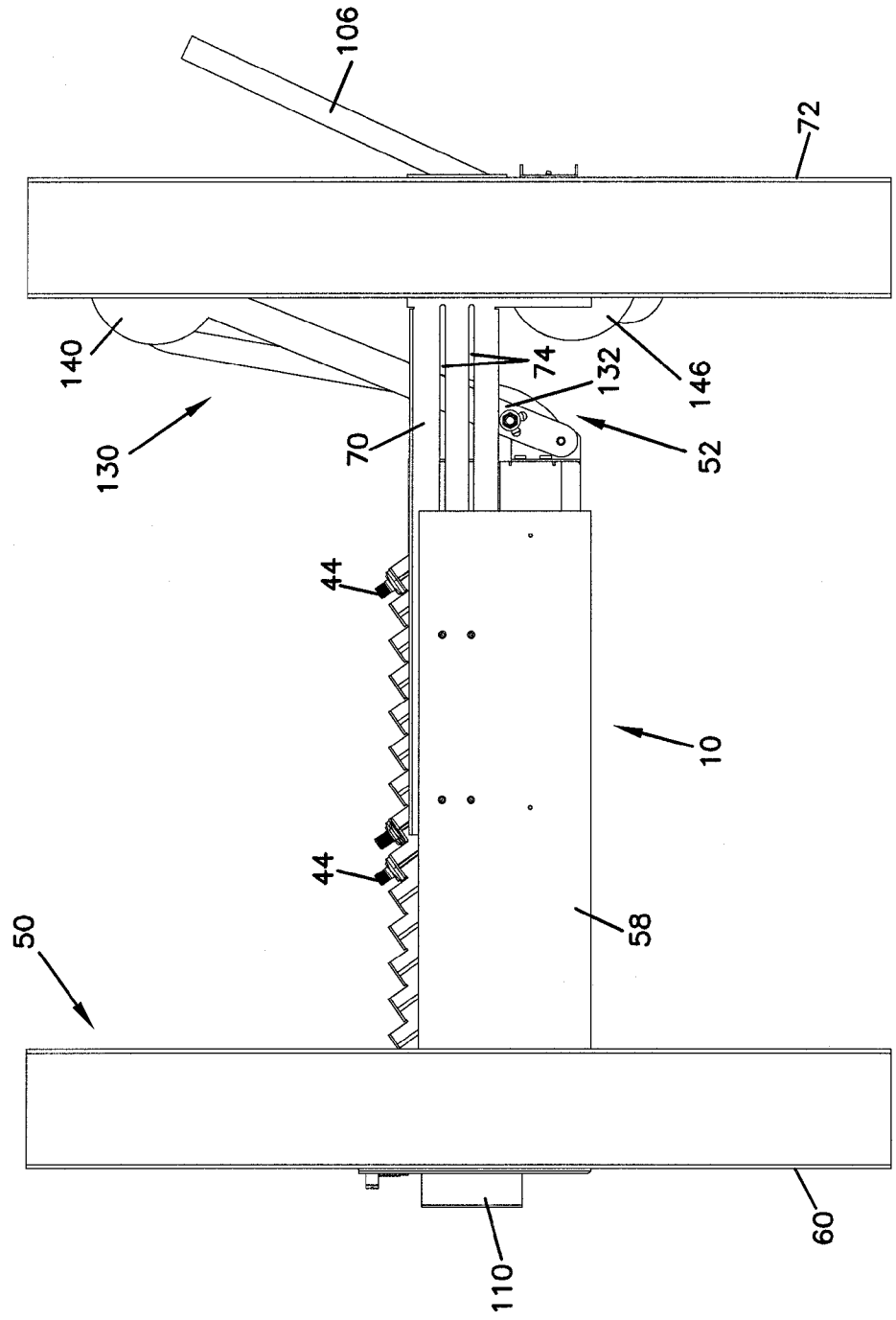
FIG. 4 is a side view of the telecommunications chassis of FIG. 3.
Figure 5:
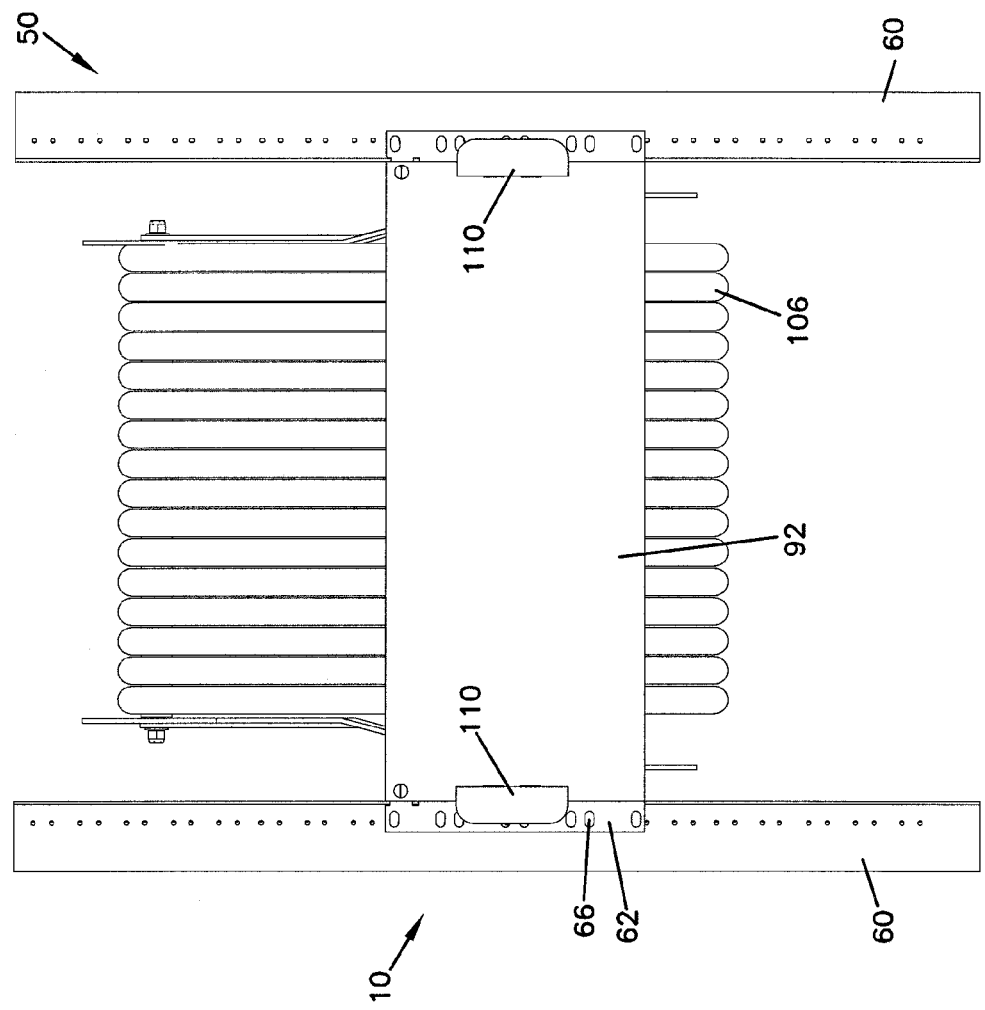
FIG. 5 is a front view of the telecommunications chassis of FIG. 3.
Figure 6:
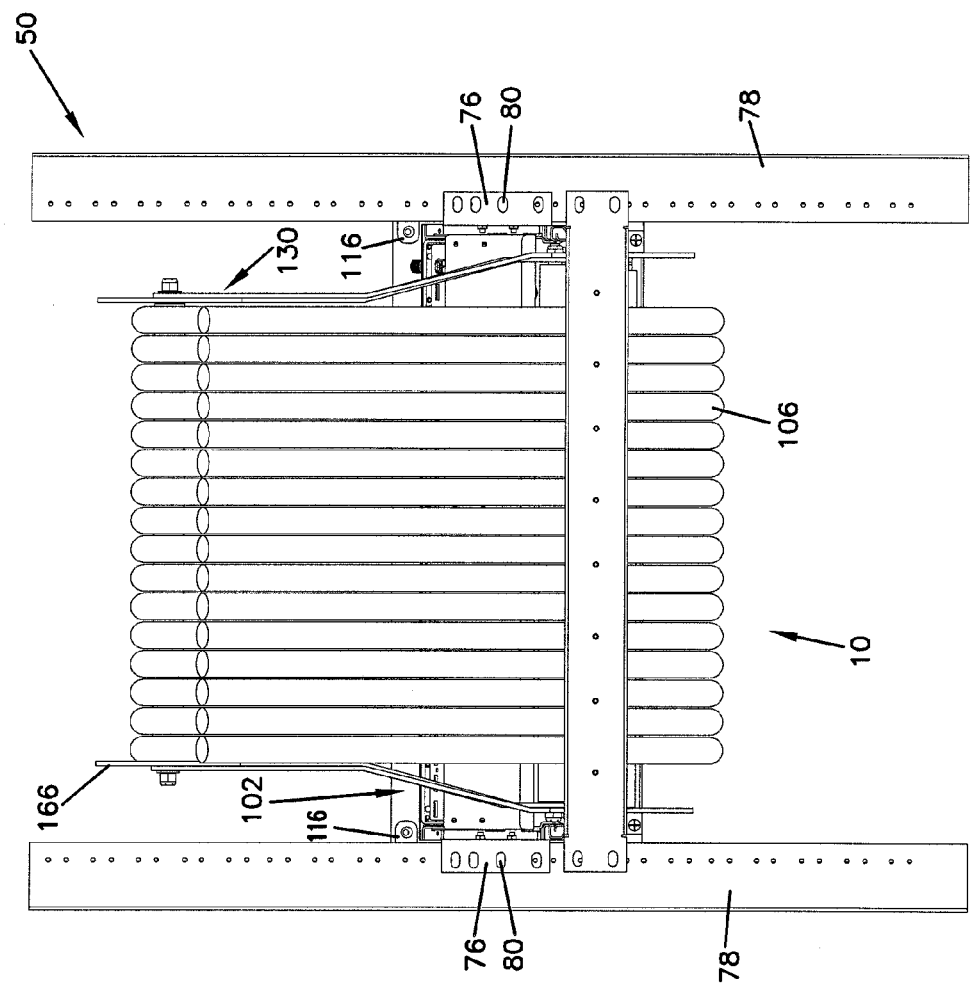
FIG. 6 is a rear view of the telecommunications chassis of FIG. 3.

The rack-mount portion 56 of the frame 52 also includes a pair of adjustment plates 70 that extend from the plates 58 to the two rear posts 72 of the rack 50. The adjustment plates 70 are slidably adjustable with respect to the plates 58 to adjust the depth of the chassis frame 52 for use with racks having different depths. In a non-limiting embodiment, the adjustment plates 70 are also made of a material such as bent sheet-metal. The adjustment plates 70 include longitudinal tracks 74 along which fasteners can be slidably moved. Once the desired depth is obtained, the fasteners are tightened between the plates 58 and the adjustment plates 70 to set the depth of the frame 52. As shown in FIG. 2, the adjustment plates 70 define flanges 76 at the rear that are bent at right angles with respect to the adjustment plates 70. The flanges 76 are used to mount the adjustment plates 70 to the rear faces 78 of the rear two posts 72. Fasteners are received through mounting holes 80 defined at the flanges 76 for mounting the adjustment plates 70. As in the flanges 62 of the plates 58, the flanges 76 of the adjustment plates 70 may be mounted at different heights along the rack posts 72 to position the chassis 10 at different desired height levels.

As best shown in FIGS. 9 and 11, the rack-mount portion 56 of the frame 52 includes slide guides 84 mounted to the plates 58. The slide guides 84 are positioned on the plates 58 below where the adjustment plates 70 are mounted. The slide guides 84 are configured to intermate with slides 86 positioned on the pull-out portion 54 of the chassis frame 52 to allow the pull-out portion 54 to be slidably movable with respect to the rack-mount portion 56. The slide guides 84 are mounted to the plates 58 with fasteners.

It will be understood that the depicted slide arrangement including the depicted slides 86 and the slide guides 84 is only one example configuration that can be used with the chassis 10. A variety of slide arrangements for drawer-type structures are known in the art. The chassis 10 may include any number of different drawer-type slide arrangements known in the art to movably mount the chassis 10 to the telecommunications rack 50.

Still referring to FIGS. 1-13, the pull-out portion 54 of the chassis frame 52 forms a generally rectangular housing 90 adapted for holding the plurality of telecommunications modules 12. The pull-out portion 54 of the frame 52 includes a front wall 92 and a rear wall 94. The pull-out portion 54 of the frame 52 also includes a bottom wall 96 that extends between left and right sidewalls 98, 100. The top side 102 of the pull-out portion 54 of the frame 52 is open for inserting/removing and accessing telecommunications modules 12. As shown in FIGS. 8, 9, and 11, the rear wall 94 of the pull-out portion 54 does not extend all the way to the bottom wall 96. A gap 104 is provided at the back of the pull-out portion 54 of the chassis frame 52 for allowing module cables 106 to exit the chassis 10, as will be described in further detail below.

The front wall 92 of the pull-out portion 54 is attached to the right and left sidewalls 98, 100. The front wall 92 may be attached to the sidewalls 98, 100 by a variety of methods including with fasteners, welding, etc. As shown in FIG. 9, the right and left sidewalls 98, 100 define flanges 108 at the front that are bent at right angles to the sidewalls 98, 100 for attachment to the front wall 92.

Extending forwardly from the front wall 92 is a pair of handles 110. The handles 110 can be used to slidably pull the chassis 10 from the rack 50. The front wall 92 also defines a pair of captive fasteners 112. The captive fasteners 112 are used to lock the pull-out portion 54 of the frame 52 with respect to the rack-mount portion 56 when the chassis 10 in a fully closed position. The captive fasteners 112 are fastened to openings 114 formed on inwardly extending tabs 116 defined by the plates 58 of the rack-mount portion 56 of the frame 52, as best shown in FIG. 9. It should be noted that the depicted interlock arrangement between the pull-out portion 54 of the frame 52 and the rack-mount portion 56 of the frame 52 is simply one example configuration that may be used with the chassis 10. Many other types of locking arrangements may be used to keep the chassis 10 in a closed position when it is fully retracted.

The chassis 10 includes the module receiving locations 40 between the front wall 92 and the rear wall 94. As noted previously, the module receiving locations 40 include slots 38. The slots 38 are formed by the right and left sidewalls 98, 100 and opposing slots 38 are formed by an intermediate wall 120 that is provided midway and parallel to the sidewalls 98, 100. The distance between either of the sidewalls 98, 100 and the midwall 120 is equal to the length of the module 12 which is defined by the distance between the sidewalls 20, 22 of the module 12.

The slots 38 are sized to slidably receive the flanges 36 projecting from the sidewalls 20, 22 of the modules 12 such that a module 12 may be slidably inserted into the chassis 10. Once the modules 10 are inserted into the module receiving locations 40, the locking screws 34 on the module front wall 16 can be inserted into locking holes 122 defined at the module receiving locations 40 in a similar manner to that described in U.S. Pat. Nos. 6,289,210 and 6,049,709 and U.S. Patent Application Publication No. 2004/0105219, which have been incorporated herein by reference in their entireties.

Since the locking screws 34 are not centrally positioned on the front wall 16 of the modules relative to the top and bottom sides 24, 26 and the locking holes 122 are not centrally positioned in module receiving locations 40 (i.e., positioned below the slots 38), a module 12 must be placed in the chassis 10 in a desired orientation and cannot be flipped 180 degrees to an undesired orientation. Thus, the locking screws 34 and locking holes 122 play a keying role during the inserting of the modules 12.

According to one embodiment, the chassis 10 includes two rows 16 opposing slots 38. In such an embodiment, the chassis 10 is configured to hold 32 modules. Other numbers are certainly possible.

According to one example embodiment, the slots 38 may be positioned at an acute angle θ, as depicted, with respect to the bottom wall 96 of the pull-out portion 54 of the chassis frame 52. The slots 38 may be angled such that the front receptacles 42 of the modules 12 face upwardly and are accessible from the open top side 102 and the rear connectors 46 extend downwardly and toward the rear of the chassis 10. Mounting the modules 12 at an acute angle θ relative to the chassis 10 provides the advantage of increasing the density of the modules 12 while providing proper cable routing for the cables 106 extending from the coaxial connectors 46 at the rear of the modules 12. By angling the modules 12, the cables 106 extending from the rear of the modules 12 do not have to be bent at a 90 degree angle and can have a smoother bend for routing out of the chassis 10. Although the slots 38 may be angled at any acute angle, in certain embodiments, the slots 38 are angled at an angle θ of between about 35 degrees and 70 degrees with respect to the bottom wall 96 of the chassis 10. In other embodiments, the slots 38 may be angled at an angle θ of between about 45 degrees and 60 degrees with respect to the bottom wall 96 of the chassis 10. In other embodiments, the slots 38 may be angled at an angle θ of about 55 degrees with respect to the bottom wall 96 of the chassis 10.

It should be noted that although in the depicted embodiment of the chassis 10, the slots 38 have been illustrated and described as being at an acute angle with respect to the bottom floor 96, in other embodiments of the chassis, the slots 38 do not have to be positioned at an acute angle and can be positioned at a ninety degree angle with respect to the bottom floor 96, wherein the modules 38 would be received straight in along a direction extending from the top side 102 toward the bottom wall 96.

Figure 7:
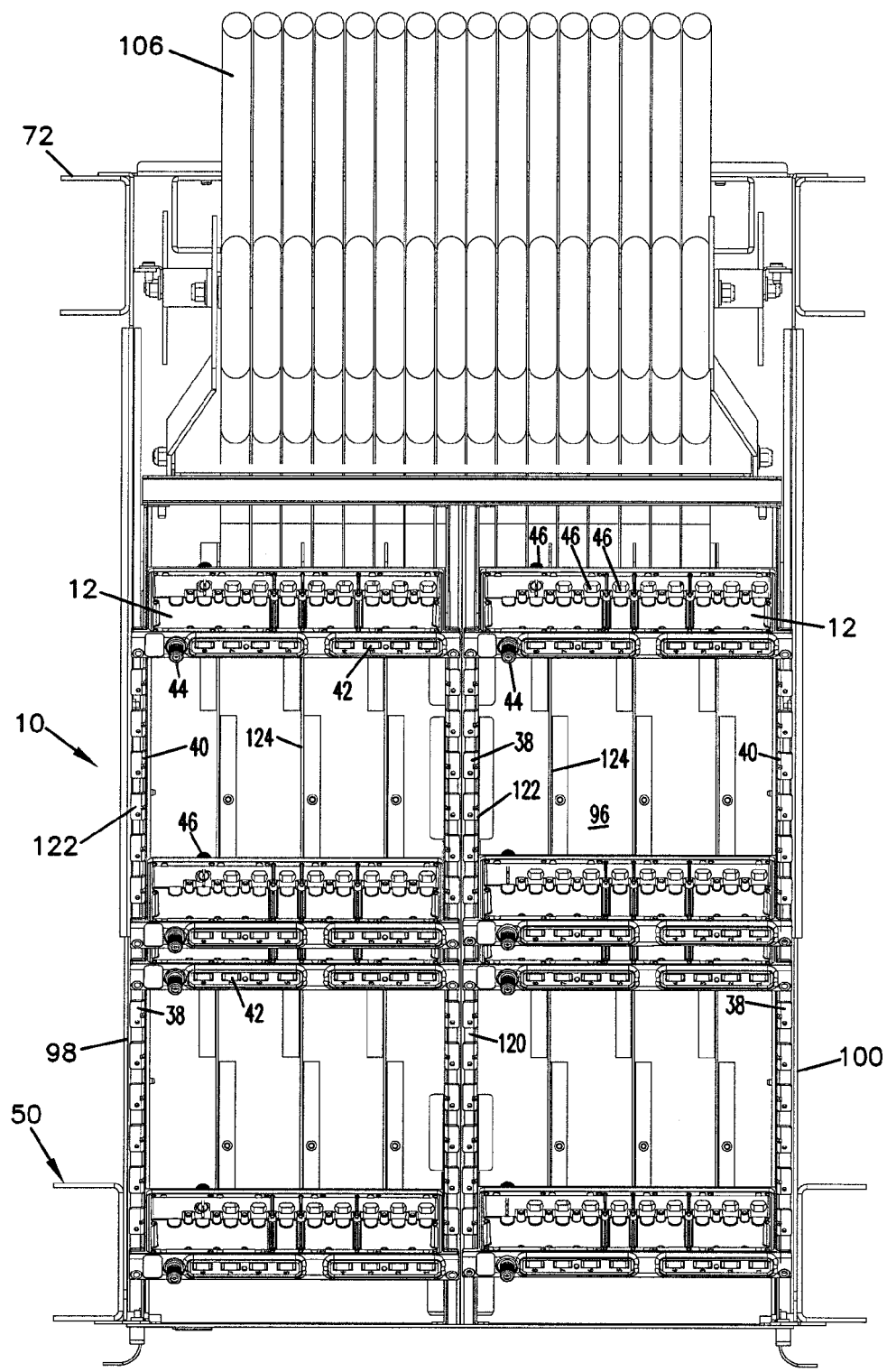
FIG. 7 is a top view of the telecommunications chassis of FIG. 3.
Figure 8:
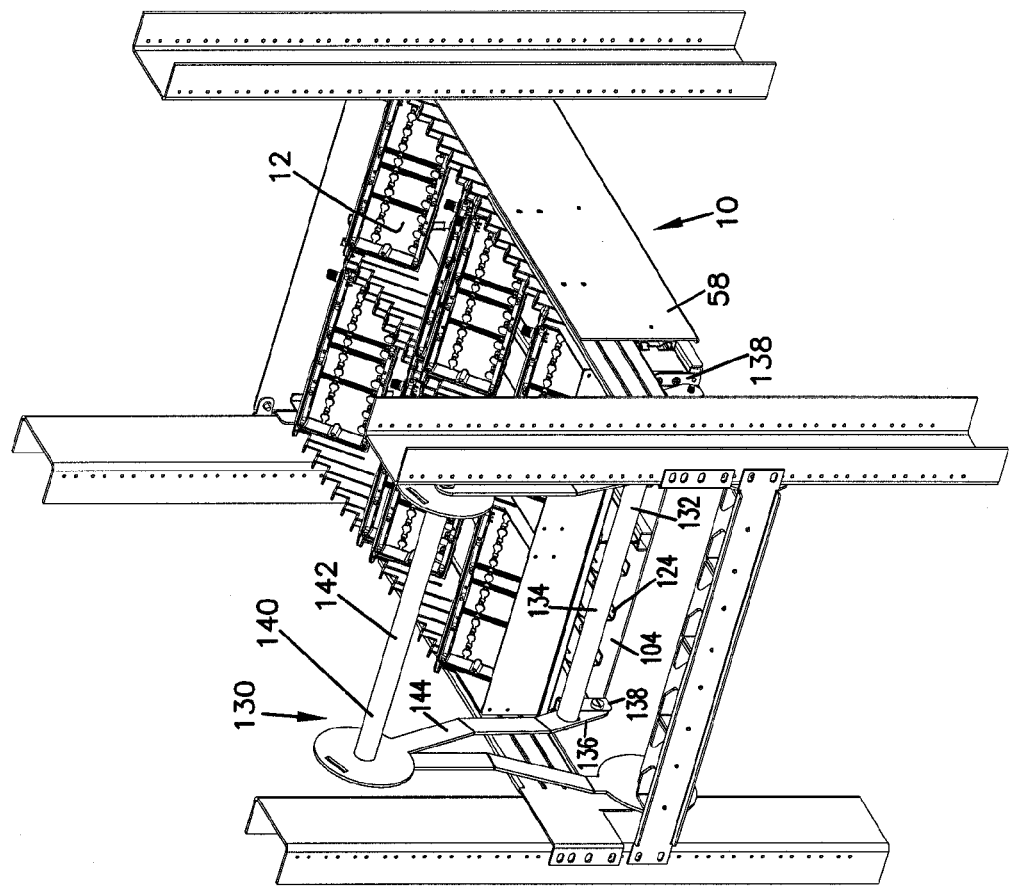
FIG. 8 is a rear perspective view of the telecommunications chassis of FIG. 1 shown without any cabling, the chassis shown in a retracted, closed position with respect to the chassis.
Figure 9:
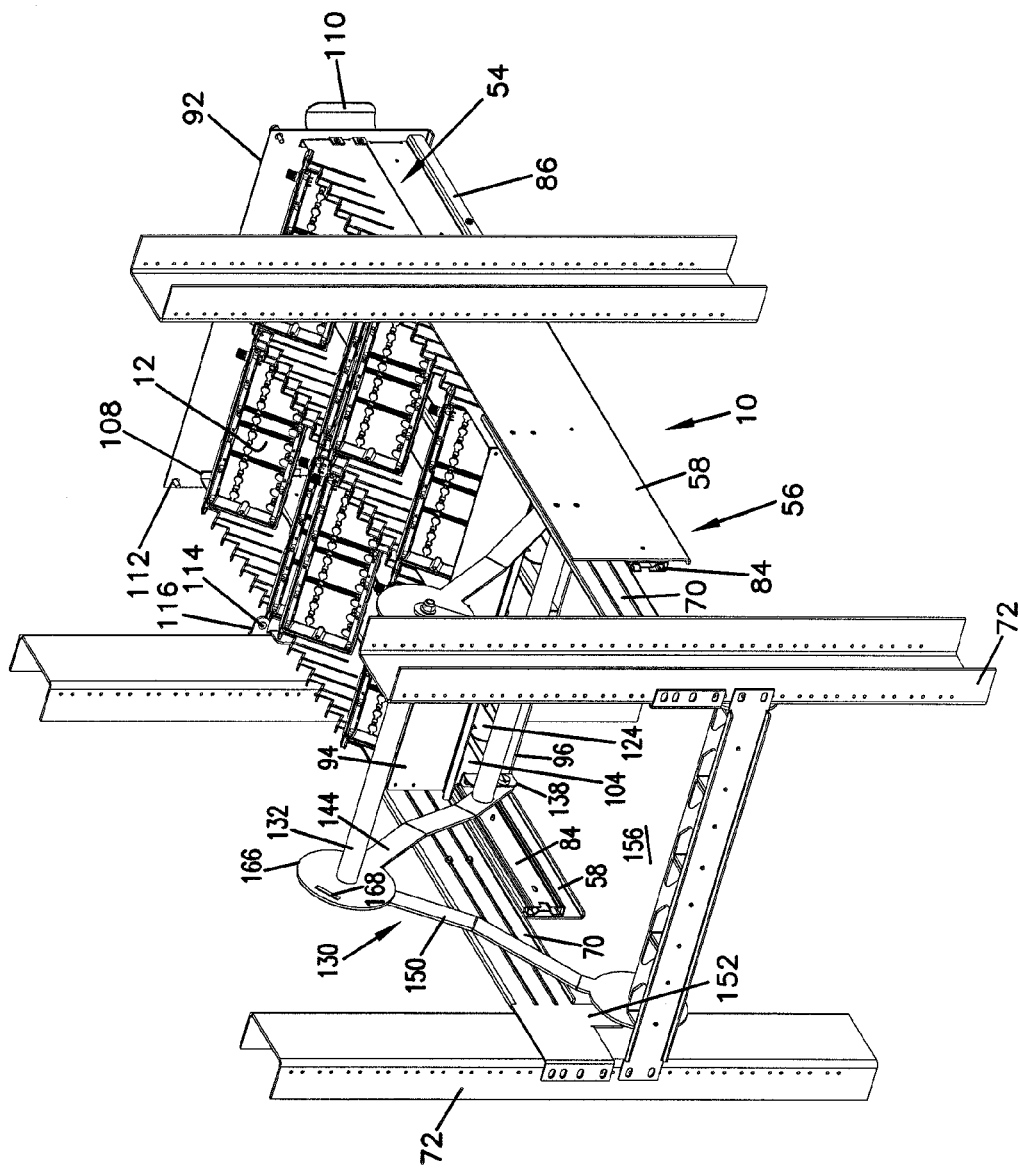
FIG. 9 is a rear perspective view of the telecommunications chassis of FIG. 8, shown in a partially extended position from the telecommunications rack.

As shown best in FIGS. 7-9, 11 and 13, the bottom wall 96 of the chassis 10 includes dividers 124 for keeping the cables 106 coming out of the modules 12 organized and guiding them out of the chassis 10 through the back. In one non-limiting embodiment, the dividers 124 are formed from bent metal plates that are fastened to the bottom wall 96 of the chassis 10. As shown in FIGS. 7 and 13, the dividers 124 extend parallel to the right and left walls 98, 100 of the pull-out portion 54 of the chassis frame 52.

The chassis 10 includes a cable management structure 130 for supporting and guiding cables 106 coming out of the chassis 10. The cable management structure 130 extends between the chassis 10 and the rear two posts 72 of the telecommunications rack 50.

Referring to FIGS. 8-13, the cable management structure 130 includes a first cable guide 132 in the form of a horizontal bar 134. The first cable guide 132 is connected to the pull-out portion 54 of the chassis frame 52 by a pair of linkages 136. The linkages 136 are pivotally connected to the rear of the pull-out portion 54 of the chassis frame 52 by a pair of brackets 138. The brackets 138 are L-shaped brackets and are fastened at the back to the right and left sidewalls 98, 100 defining the slots 38 of the chassis 10.

The cable management structure 130 includes a cable support 140 in the form of a horizontal bar 142. The cable support 140 is fixedly connected to the first cable guide 132 through a pair of solid linkage members 144.

The cable management structure 130 includes a second cable guide 146 in the form of a horizontal bar 148. The second cable guide 146 is mounted to the cable support 140 through a pair of linkages 150 that are pivotally disposed with respect to the cable support 140. The second cable guide 146 is also rotatably mounted (thus, the linkages 150 extending from the second cable guide 146 are pivotally mounted) to the rear two posts 72 of the telecommunications rack 50 through the adjustment plates 70. As shown in FIGS. 7-9 and 13, the adjustment plates 70 include downwardly extending tab portions 152 which include stamped out bent portions 153 (FIG. 13) to which the second cable guide 146 is fastened to with brackets 154. In the depicted embodiment, the brackets 154 are L-shaped and receive fasteners for rotatably mounting the second cable guide 146.

As shown in FIGS. 8-12, with the pivotal configuration of the first cable guide 132, the cable support 140 and the second cable guide 146, the cable support 140 of the cable management structure 130 moves between an elevated position and a lowered position with respect to the chassis housing 90 and the telecommunications rack 50.

As will be discussed in further detail, the pivotal movement of the cable support 140 allows the cables 106 behind the chassis housing 90 to be moved out of the way of the chassis 10 when the chassis 10 is brought from an open position to a closed position. When the chassis 10 is slidably opened to access the modules 12 housed therein, the cable support 140 moves to a lowered position and lays the cable 106 in the space 156 created behind the chassis 10.

The chassis 10 also includes a third cable guide 158 fastened to the rear two posts 72 of the rack 50. The third cable guide 158 includes flanges 160 at the right and left sides thereof for mounting to the posts 72 of the rack 50. The cable guide flanges 160 are normally fastened underneath the location where the adjustment plate flanges 76 are fastened. The third cable guide 158 may be located at other locations of the rack 50 depending upon the cable routing configuration desired. The third cable guide 158 includes channels 162 for directing cables 106 either upwardly or downwardly adjacent the rear of the telecommunications rack 50.

Using the first, second, and third cable guides 132, 146, and 158 and the movable cable support 140, cables 106 extending from the coaxial connectors 46 of the modules 12 can be routed in a variety of different configurations.

For example, FIGS. 1-2 illustrate one sample cable routing arrangement for the chassis 10, wherein cables 106 are routed downwardly adjacent the rear of the rack 50. In the example routing shown in FIGS. 1-2, the cables first exit the chassis 10 through the gap 104 positioned at the rear of the chassis 10 underneath the rear wall 94. The cables 106 are then directed upwardly after passing underneath the first cable guide 132. The cables 106 then go upwardly and over the cable support 140 and then downwardly from thereon. When the chassis 10 is moved from a closed position to an open position, the cables 106 supported by the cable support 140 are lowered and lay in the space 156 created behind the chassis housing 90.

FIGS. 3-7 illustrate another example cable routing arrangement wherein the cables 106 are directed upwardly adjacent the rear of the telecommunications rack 50. In the arrangement shown in FIGS. 3-7, the cables 106 first exit the chassis 10 through the gap 104 positioned at the rear of the chassis underneath the real wall 94. The cables 106 are then directed upwardly after passing underneath the first cable guide 132. The cables 106 then go upwardly and pass over the cable support 140. Once the cables pass over the cable support 140, they are routed downwardly and around the second cable guide 146. From the second cable guide 146, the cables 106 are routed upwardly, passing through the channels 162 of the third cable guide 158 mounted to the rear posts 72. Similar to the routing configuration of FIGS. 1-2, when the chassis 10 is moved from a closed position to an open position, the cables 106 supported by the cable support 140 are lowered and lay in the space 156 created behind the chassis housing 90.

The cable support 140 and the second cable guide 146 include circular flanges 166 at ends thereof forming spool-like configurations. The flanges 166, as depicted, may include slots 168 for tying belt/band type structures (e.g., with hook and loop fasteners) for keeping the cables 106 against the horizontal bars 134, 142 and to prevent the cables 106 from popping up.

The cable support 140 is configured to carry a majority of the weight of the cables 106 being routed out of the chassis housing 90. As discussed above, when the chassis 10 is in a fully closed position, the pull-out portion 54 of the chassis frame 52 may be locked with respect to the rack-mount portion 56 of the frame 52 to keep the chassis 10 in the closed position. When the chassis 10 is open, however, the weight of the cables 106 is likely to keep the chassis 10 in the open position by resisting rearward slidable movement of the chassis 10.

The cable management structure 130 of the chassis 10 is configured such that when the chassis 10 is moved between the fully closed position and the fully open position, the length of cable 106 is held constant by the cable management structure 130 without any pulling or pushing forces felt on the cable. When the chassis 10 is moved from a closed position to an open position, the cables 106 flatten out and rest in the space 156 created behind the chassis 10. When the chassis 10 is moved from an open position to a closed position, the cable support 140 raises, pushing the cables 106 up and out of the way of the chassis 10.

In certain embodiments, some amount of cable slack may be provided in the chassis housing 90 such that the modules 12 may be pulled out from the module receiving locations 40 of the chassis 10. The cable slack may be provided between the coaxial connectors 46 of the modules 12 and the cable management structure 130 for allowing the modules 12 to be pulled out In one embodiment, the cable management structure 130 including the first, second and third cable guides 132, 146, 158 and also the cable support 140 are sized and configured to support 320 cables (up to 32 modules×10 cables for each module). The cables 106 coming out of the module connectors 46 may be bundled in groups and a multicable or multiconductor bundle that uses a single jacket may be used to organize the cables 106. Depending upon the organizational needs, 5 pack, 10 pack or 8 pack bundling of coaxial conductors may be used. In the embodiment depicted in FIGS. 1-13, the cables/conductors coming out of the chassis are illustrated with 5-pack multicable/multiconductor bundles. Thus, in the depicted embodiment, a chassis 10 carrying 8 modules, each having 10 coaxial rear connectors, have 16 bundled cables exiting the chassis 10.

According to another embodiment of the chassis, the front wall of the chassis may include a monitor panel that is in electrical contact with the circuitry within the modules 12 housed within the chassis. As such, the modules 12 may be monitored from outside the chassis without having to slidably open the chassis and access the individual monitor ports of the individual modules 12. In such an embodiment, the monitor ports that are accessible from outside the chassis may be connected with cables to the monitor ports of the individual modules within the chassis.

Examples of various inventive aspects of the present disclosure have been described herein. It will be appreciated that modifications and equivalents of the disclosed inventive aspects are intended to be included within the broad scope of the present disclosure.

We claim:

1. A telecommunications chassis comprising:
a front wall, a rear wall, a bottom wall extending between the front and rear walls, and right and left sidewalls extending between the front and rear walls, the chassis configured to be mounted to a vertical telecommunications rack, wherein, once mounted, the chassis is configured to be slidably movable relative to the rack, in a direction that is substantially perpendicular to the rack, to bring the chassis from a storage position to an access position, the chassis including mounting flanges generally parallel to the front and rear walls for mounting the chassis along the vertical telecommunications rack, the chassis defining an open top side for removably receiving telecommunications modules into the chassis from the top side; and
a plurality of module receiving locations provided within the chassis, each module receiving location defining an elongate guide for intermating with an elongate guide of the telecommunications module for receiving the module, wherein the guides of the module receiving locations are disposed, substantially adjacent to and parallel with the right and left sidewalls and form an acute angle with the bottom wall of the chassis for receiving the modules at an acute angle with respect to the bottom wall.

2. A telecommunications chassis according to claim 1, wherein the guides of the module receiving locations are disposed at an angle between about 35 degrees and 70 degrees with respect to the bottom wall.

3. A telecommunications chassis according to claim 1, wherein the chassis is configured to fit in a standard 19-inch width telecommunications rack and is configured to occupy a space of four standard rack units in height.

4. A telecommunications chassis according to claim 3, wherein the chassis is configured to receive thirty-two telecommunications modules.

5. A telecommunications chassis according to claim 1, wherein the chassis is configured to be depth-adjustable for mounting to telecommunications racks having different depths along a front to rear direction of the telecommunications racks.

6. A telecommunications chassis according to claim 1, wherein the module receiving locations include locking arrangements for locking the modules once the modules are received in.

7. A telecommunications chassis comprising:
a housing defining a front end, a rear end and an interior extending between the front end and the rear end, the housing configured to house telecommunications equipment within the interior, wherein cables connected to the telecommunications equipment are configured to exit the housing through the rear end, the housing configured to be mounted to a telecommunications rack, wherein, once mounted, the housing is configured to be movable relative to the telecommunications rack between a fully-retracted closed position and a fully-extended open position; and
a cable management structure mounted between the housing and at least a portion of the telecommunications rack, the cable management structure including a cable support attached to the housing with a first linkage and attached to the telecommunications rack with a second linkage, the first linkage being pivotally movable with respect to the second linkage to move the cable support between a raised position and a lowered position with respect to the housing, wherein the cable support is configured to move upwardly to move the cables exiting through the rear of the housing and supported by the cable support out of the way of the housing when the housing is moved from the open position toward the closed position and configured to move downwardly with respect to the housing when the housing is moved from the closed position toward the open position,
wherein the cable management structure includes a first horizontal bar, a second horizontal bar and a third horizontal bar all parallel to each other, the second horizontal bar defining the cable support and being located between the first and third horizontal bars and being movable with respect to the first and third horizontal bars along the up and down direction.

8. A telecommunications chassis according to claim 7, wherein the chassis
includes a frame with a rack-mount portion configured for mounting on the telecommunications rack and a pull-out portion that is movable with respect to the rack-mount portion, the housing forming a part of the pull-out portion of the frame.

9. A telecommunications chassis according to claim 7, wherein the cable support includes a horizontal bar.

10. A telecommunications chassis according to claim 7, wherein the housing is configured to be mounted to a four-post telecommunications rack, wherein the cable management structure is mounted between the rear end of the housing and two rear posts of the telecommunications rack.

11. A telecommunications chassis according to claim 7, wherein the chassis is configured to be depth-adjustable for mounting the housing to telecommunications racks having different depths along a front to rear direction.

12. A telecommunications chassis according to claim 7, wherein the housing is lockable with respect to the telecommunications rack when the housing is in the closed position.

13. A telecommunications chassis according to claim 7, wherein the housing is configured to fit in a standard 19-inch width telecommunications rack and is configured to occupy a space of four standard rack units in height.

14. A method of managing cables extending from a rear end of a telecommunications chassis mounted on a telecommunications rack, the chassis being slidably movable between a retracted position and an extended position relative to the telecommunications rack, the method comprising:
mounting a cable management structure between the chassis and at least a portion of the telecommunications rack, wherein the cable management is configured to automatically raise the cables extending from the rear end of the telecommunications chassis upwardly out of the way of the chassis when the chassis is brought from the extended position toward the retracted position and is configured to automatically lower the cables extending from the rear end of the telecommunications chassis when the chassis is brought from the retracted position toward the extended position, wherein the cable management structure includes a first horizontal bar, a second horizontal bar and a third horizontal bar all parallel to each other, the second horizontal bar defining a cable support and being located between the first and third horizontal bars and being movable with respect to the first and third horizontal bars in an upward and downward direction.

15. A method according to claim 14, further comprising bringing the chassis from the retracted position to the extended position and slidably inserting a telecommunications module into the chassis.

16. A method according to claim 14, further comprising bringing the chassis from the retracted position to the extended position and slidably removing a telecommunications module from the chassis.

17. A telecommunications chassis comprising:
  a housing with a front wall, a rear wall, a bottom wall extending between the front and rear walls, and right and left sidewalls extending between the front and rear walls, the housing configured to be mounted to a vertical telecommunications rack, wherein, once mounted, the housing is configured to be slidably movable relative to the rack to bring the housing from a storage position to an access position, the housing defining an open top side for removably receiving telecommunications modules from the top side, the housing including a plurality of module receiving locations, each module receiving location defining an elongate guide for intermating with an elongate guide of the telecommunications module for receiving the module;
  mounting flanges generally parallel to the front and rear walls of the housing for mounting the housing along the vertical telecommunications rack; and
  a cable management structure mounted between the housing and at least a portion of the telecommunications rack, the cable management structure configured to move the cables exiting from the rear wall of the housing upwardly, out of the way of the housing, when the housing is moved from the access position toward the storage position and move the cables exiting from the rear wall of the housing downwardly with respect to the housing when the housing is moved from the storage position toward the access position.

18. A telecommunications chassis according to claim 17, wherein the chassis includes a frame with a rack-mount portion configured for mounting on the telecommunications rack and a pull-out portion that is movable with respect to the rack-mount portion, the housing forming a part of the pull-out portion of the frame.

19. A telecommunications chassis according to claim 17, wherein the housing is
  configured to be mounted to a four-post vertical telecommunications rack, wherein the cable management structure is mounted between the rear end of the housing and two rear posts of the telecommunications rack.

20. A telecommunications chassis according to claim 17, wherein the chassis is configured to be depth-adjustable for mounting the housing to telecommunications racks having different depths along a front to rear direction of the telecommunications racks.

21. A telecommunications chassis according to claim 17, wherein the housing is lockable with respect to the telecommunications rack when the housing is in the closed position.

22. A telecommunications chassis according to claim 17, wherein the housing is configured to fit in a standard 19-inch width telecommunications rack and is configured to occupy a space of four standard rack units in height.

* * * * *